FIG.14
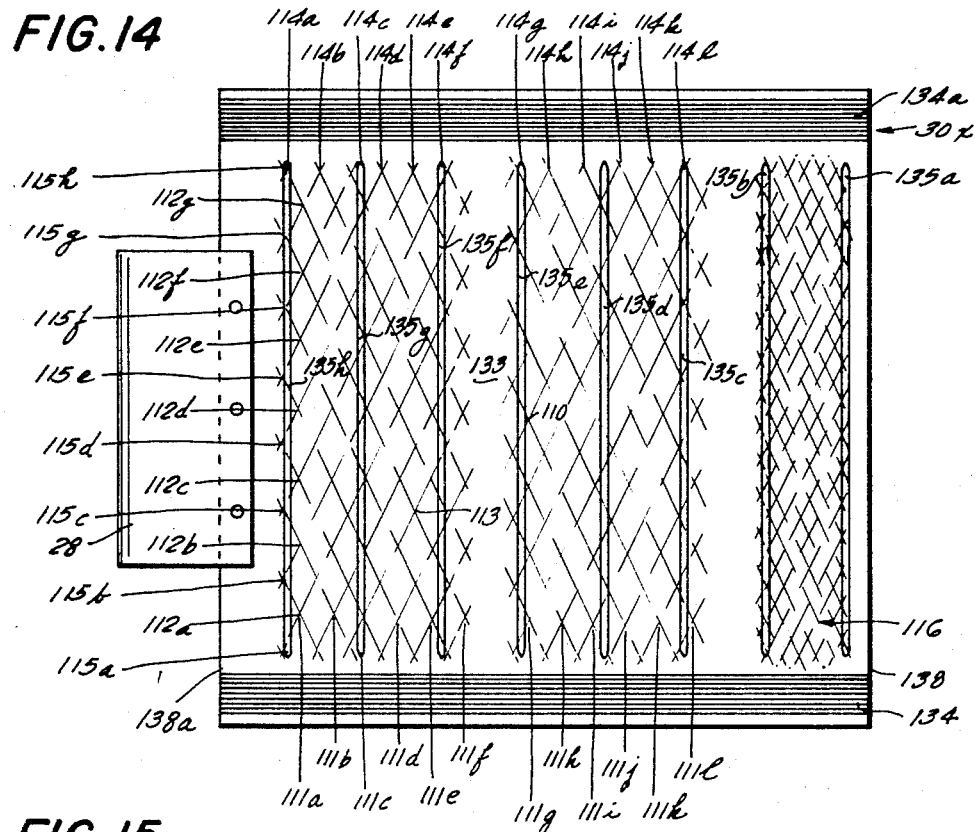
FIG.15
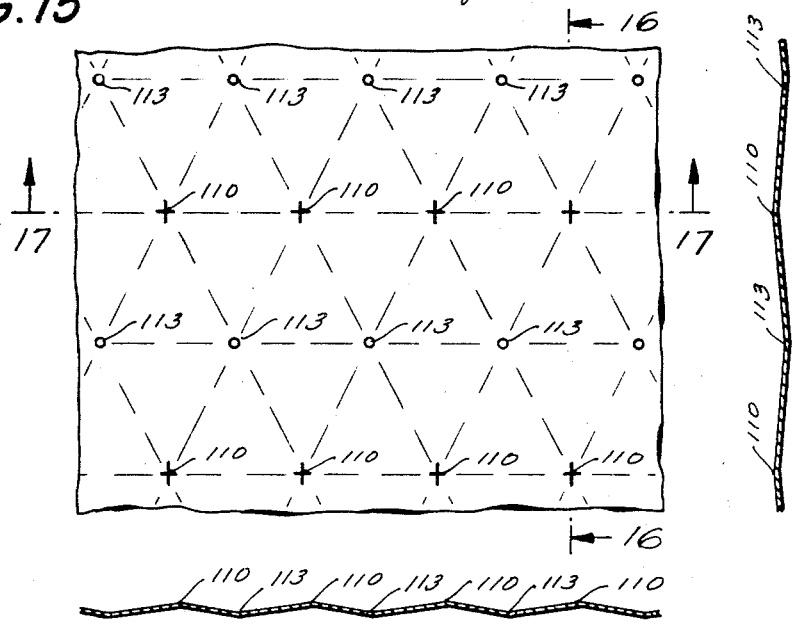
FIG.16
FIG.17

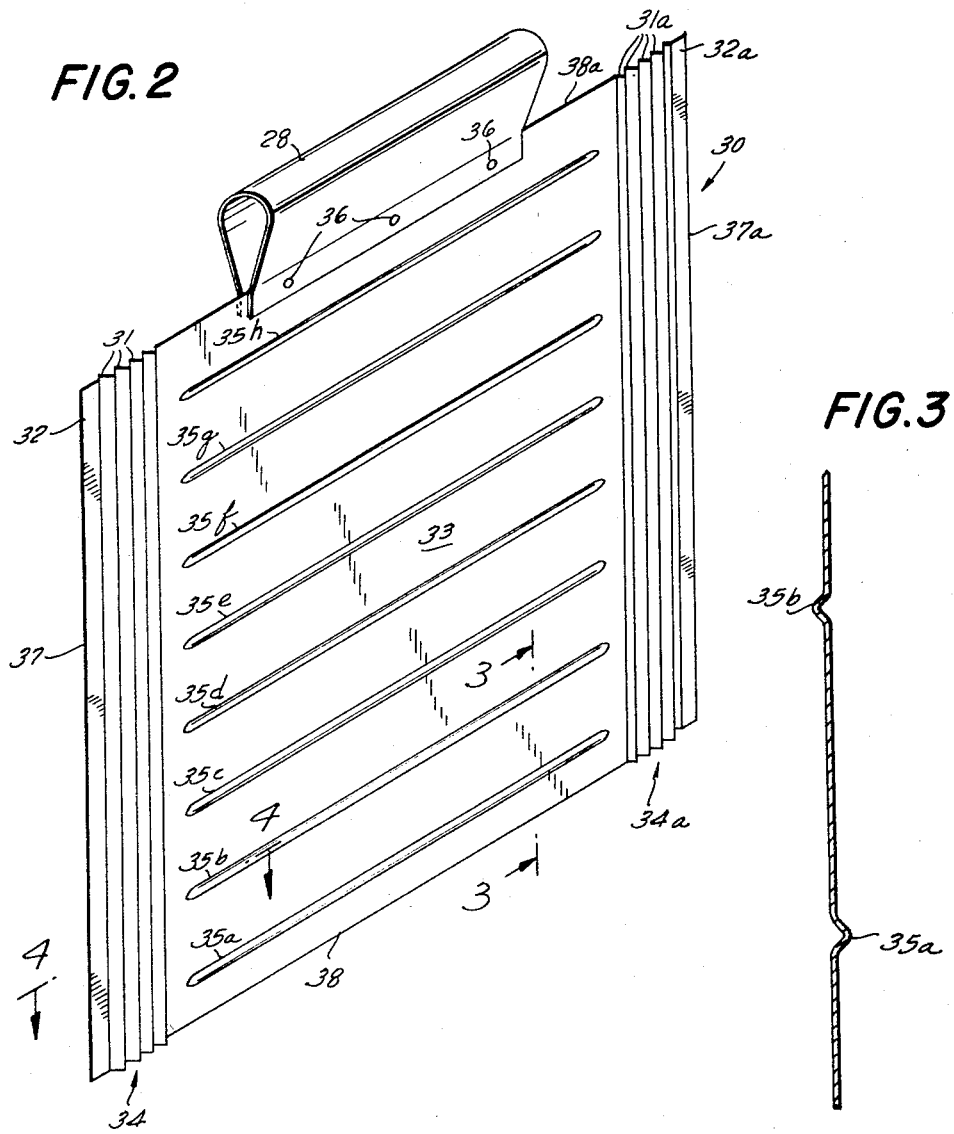
FIG. 2
FIG. 3
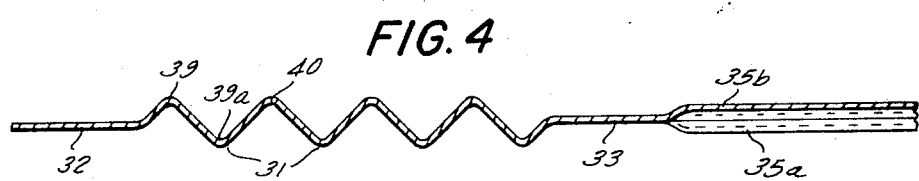
FIG. 4

United States Patent Office 3,430,479
Patented Mar. 4, 1969

3,430,479
APPARATUS FOR SIMULTANEOUSLY PRESSING
A PLURALITY OF CATHODE SHEETS
Marion S. Bell, Anthony Allan Montrose, and Bill Hugh Spoon, El Paso, Tex., assignors to Phelps Dodge Refining Corporation, New York, N.Y., a corporation of New York
Filed Apr. 17, 1967, Ser. No. 631,378
U.S. Cl. 72—400　　　　　　　　　　　　　　　7 Claims
Int. Cl. B21j 7/16, 11/00

ABSTRACT OF THE DISCLOSURE

Apparatus for simultaneously pressing a plurality of cathode sheets, each having a layer of electrolytically deposited metal on both sides, for use in electrolytic refining of metal, such as copper, comprising a multiple platen press with platen face tooling to exert forces on both sides of the sheet to stress the metal beyond its elastic limit at adjacent spaced points over substantially its entire planar area.

---

This invention relates generally to copper refining by electrolysis for producing cathode copper by the so-called multiple system. More particularly, the invention relates to apparatus for manipulation of cathode sheets during the intermittent stages of the process which is carried out to produce the finished copper cathodes of commerce.

It has been conventional practice in electrolytic production of the cathodes of commerce to produce cathode starting sheets by electro-depositing copper from copper anodes in an electrolytic tank containing an electrolyte comprising an aqueous copper sulfate acid solution. The starting sheets conventionally have been prepared by plating the copper from the anode onto a metallic plate (sometimes called a "mother" plate or starting sheet blank) of copper or other suitable metal, the surface of which is smooth and has been lubricated, greased or treated in such fashion that after a thin layer of copper is deposited on the mother plate, it may be removed from the electrolyte solution, stripped off, and straightened to produce a sheet of cathode copper of suitable size and thickness to serve as a starting sheet or starting cathode in the commercial electrolytic tank.

In most electrolytic copper plants, the electrolytic tanks in which the thin starting sheets are produced are referred to as "stripper" tanks. The electrolytic tanks to which the thin starting sheets are transferred and in which the electrolytic process is continued for building up a deposit of copper from copper sulfate solution from the corrosion of copper anodes onto both sides of the starting sheet cathode to a thickness desirable for finished commercial cathodes, are referred to as "commercial" tanks. Usually, the composition of the electrolyte solution used in the stripper tanks differs from the composition of the electrolyte solution used in the commercial tanks.

In the conventional practice, the starting sheets that are placed in the commercial tank have been thin, and the size may vary. The thickness in certain plants commonly has been about 0.030" to about 0.035". But it may be thicker or thinner in some plants. Also, the overall dimensions in different plants may differ. A size of 37½" x 37½" is quite common and is extensively used. The starting sheets, after being stripped from the mother plate and straightened, by hand or mechanically, are provided with loops made of strips of similar material; the loops being fastened to the upper edge portion of the sheets to provide means for supporting the starting sheets on rods of conductor material. The rods, usually of copper, have end portions which rest upon conductor members, conventionally supported on the walls of the electrolytic tank with the starting sheet suspended in the electrolytic solution in the tank. It will be understood that there is a large number of starting sheets suspended in the commercial tanks alternately with the copper anodes, which are to be dissolved and the copper deposited on the cathode sheets to form the copper cathodes of commerce. The anodes are suspended on conductor members, as known in the art.

It is well known that after the thin prepared starting sheets are placed in the commercial electrolytic tanks, current applied, and the electrolytic process has begun, the starting sheets have a tendency to warp, bend or get out of flat shape, resulting in uneven deposits of copper on the cathode sheets or causing short circuits with adjacent anodes. Prior practice has required adjustment of the sheets in the tanks or removal of the cathode sheets during their early life in the commercial tank and laborious manual work to straighten the sheets or to adjust the position of the distorted cathode sheets in the tank. It was once common practice to remove the warped or bent sheets after they had been on circuit for a day or so and they were wet-flapped by hand by placing an individual sheet on a flat, inclined table and striking the sheet with a flapping paddle. This wet-flapping could straighten the sheet only at localized areas and blows with a paddle at localized areas resulted in setting up undesirable strains in the sheet at other areas, so the wet-flapping method of straightening such sheets that were removed from the commercial tank did not prevent further warping when the sheets were replaced in the commercial tank. The practice of manual wet-flapping has been largely abandoned because of drawbacks.

Various approaches have been made to avoid or eliminate this arduous work of wet-flapping or of adjusting the position of the cathode sheets in the commercial tank to avoid short circuits, or uneven copper deposition. Various kinds of mechanical levelers or straighteners have been used for straightening or levelling the starting sheets after they have been stripped from the mother plates on which they were formed. Various crimps, ridges in various patterns have been applied to the thin starting sheets to stiffen them or to rigidize them prior to placing them in the commercial tanks where the copper is deposited from a copper sulfate solution from the corrosion of copper anodes onto the cathode sheets for producing the finished cathodes. Although this levelling and straightening of the thin starting sheets has been long practiced, it has not been an entirely satisfactory solution to the problem of maintaining the sheets straight in the commercial tanks during the rather lengthy process to carry the starting sheets to finished cathodes.

Notwithstanding the levelling, straightening and so-called rigidizing of the thin starting sheets before they are placed in the commercial tanks, a large number of them develop warpage or other bending or distortion so that short circuits result soon after they are loaded into the commercial tanks. Although hand wet-flapping has been applied to the sheets by removing the cathode sheets from the electrolyte after they have received a commercial deposit for a day or two and beating them individually with a paddle, short circuits still develop in the commercial tanks, due to warping or distortion of the cathode sheets. The electrolytic process must be kept under control to avoid the short circuits, so far as it is possible to do so. That is, individual sheets where short circuits develop, or are likely to develop, must be manipulated and maintained in proper position in the commercial tank to eliminate or avoid these short circuits. This has been done by hand labor and is commonly referred to in the industry as "hot sheet work." The proficiency of the hot sheet work is a major factor in determining the ampere efficiency of the tank house operation. So it will be seen that commonly practiced methods of producing finished copper cathodes of commerce are subject to the drawbacks of requiring much hand labor and loss of production due to the relatively large number of short circuits that develop between the anodes and cathodes due to warping, bending, or other distortion of the cathode starting sheets, particularly during the early stages of the process that is carried out in the commercial tanks. And although many prior patents are directed to the treatment and manipulation of the starting sheets and to the problem of straightening, pressing, providing particular patterns of depressions, ridges and crimps for the purpose of rigidizing the thin starting sheets as stripped from the mother plate, the present state of the art is such that much labor is required by hot sheet workers whose work is to manipulate the starting cathodes in the early stages of the electrolytic process after the starting sheets have been loaded in the commercial tanks between adjacent copper anodes.

It is an object of this invention to eliminate much of this arduous work that the hot sheet men perform during the electrolytic process carried out to produce finished copper cathodes of commerce and otherwise to increase the efficiency of operation in producing cathode copper.

This invention provides a multiple platen press for carrying out a process for producing cathode copper which comprises preparing thin cathode starting sheets, placing the starting sheets in an electrolytic tank having anodes and containing electrolyte solution, depositing copper upon both sides of said starting sheets so that each side of said sheets has a layer of deposited copper of substantial thickness thereon of substantially uniform characteristics, thereby forming intermediate cathode sheets substantially thicker and heavier than said starting sheets, straightening and stiffening said intermediate cathode sheets by applying a pressure on the surfaces of said sheets in a direction perpendicular to said surfaces using forces equally distributed over said surfaces and sufficient to give said intermediate cathodes a permanent straight set, thereby producing pressed intermediate cathode sheets and then depositing copper on said pressed intermediate cathode sheets in an electrolytic tank to a thickness of copper cathodes of commerce.

More particularly, the invention provides a multiple platen press for simultaneously pressing a plurality of cathode sheets in which the platens have face tooling admirably suited for engaging the planar surfaces of said sheets for straightening and stiffening said sheets by applying pressure on the planar areas of the cathode sheets in a direction perpendicular to the planar areas of said sheets, using equally distributed forces sufficient to stress the metal beyond its elastic limit to give said sheets a permanent set.

For convenience of description and for purposes of nomenclature for distinguishing the thin starting sheets as they exist before they are placed in the commercial tanks from the cathode sheets after they have been placed in the commercial tanks and have received a deposit of copper of substantial thickness on both sides of the starting sheets in the early stages of the process carried out in the commercial tanks are herein called "starting sheets." That is, the thin sheets which were stripped from the mother plate and hence have one side which is smooth and dense because it was stripped from the mother plate and which has the opposite side of coarser unsmooth deposited copper, is herein called a "starting sheet." The starting sheet, after it has been placed in the commercial tank and has a substantial thickness of electrolytically deposited copper of uniform characteristics on both sides, and is at least two times thicker than the starting sheet, is herein called an "intermediate cathode" sheet. This nomenclature is used to distinguish the "intermediate cathode" from a thin starting sheet and the finished copper cathode which is much thicker and is herein called or referred to as the "finished cathode" of commerce.

The apparatus provided by this invention is admirably suited for use in carrying out the method of electrolytic refining wherein the starting sheets at the outset or during their early life in the electrolytic tank are treated and manipulated in such fashion that the procedure known as wet-flapping with a paddle is eliminated and otherwise the procedure known as hot sheet work is reduced to a minimum, with the result that full age and finished cathodes may be more efficiently produced. In accordance with the method mentioned above, wherein cathode sheets are subjected to a pressing operation after having copper deposited on both sides of the sheet, the starting sheets, as stripped, or after they have been straightened, levelled or given a rigidizing treatment, are placed in an electrolytic tank, which preferably is a conventional commercial tank in the plant, where a copper deposit of substantial thickness is deposited on both sides of the starting sheet to give the sheet sufficient body that it can be pressed under conditions, as hereinafter further described, that will cold work the metal and will give it a permanent set so that it will not thereafter warp or distort to cause short circuits in the electrolytic tank, during the course or depositing copper on the cathode sheet to sufficient thickness to form a finished cathode of commerce.

In accordance with one manner of practicing that method, the starting sheet, after it has been in the heated electrolyte solution in the commercial tank for a brief period of time and has had a layer of copper deposited on it on each side and the metal has become at least partially annealed, is subjected to a mechanical treatment under sufficient pressure exerted uniformly over the entire area of the sheet in a direction perpendicular to the plane of the sheet. The heavier, thicker and annealed, or at least partially annealed, cathode sheets are more amenable to mechanical straightening and permanent set to produce sheets which, when replaced in the commercial tank, remain straight in the commercial tanks throughout the copper deposition process up to the time the cathodes reach complete or finished thickness. Thus, the spring back and warping characteristics, common to the cathode sheets of the prior art, is prevented.

According to a preferred way of practicing that method, starting sheets having a thickness of 0.030"–0.035" are prepared in a stripper tank. These thin starting sheets are then straightened and crimped, preferably as more fully described hereinafter. These thin starting sheets are then placed in a commercial tank wherein a layer of copper is deposited on both sides of the thin cathode sheets. When the cathode starting sheets are of a thickness of 0.09" to 0.10", or have a layer of deposited copper on both sides of substantially uniform characteristics, and have been subjected to heat of the electrolyte circulated in the tank and had sufficient annealing to render the metal amenable to cold working, they are removed from the commercial tank. These intermediate cathode sheets may then be subjected to a pressing in a multiple platen press, as provided by this invention, wherein the platens apply forces in a direction perpendicular to the planes of the sheets; the platens having face tooling which presses the individual intermediate cathode sheets on both sides in adjacent small areas or loci over substantially the entire planar areas of the sheets. The pressure applied by the platens is uniformly distributed and is sufficient to stress the metal beyond its elastic limit in the small adjacent areas or loci to give the intermediate cathode sheets a permanent set.

Although the novel features which are believed to be characteristic of the invention are pointed out in the annexed claims, the invention itself as to its objects and advantages and the manner of carrying it out, may be better understood by reference to the following more detailed description taken in connection with the accompanying drawings forming a part hereof, in which:

FIG. 2 is a view in perspective of a preferred form of starting sheet prepared for loading into a commercial electrolytic tank;

FIG. 3 is a view in section partly broken away on line 3—3 of FIG. 2;

FIG. 4 is a view in section on line 4—4 of FIG. 2;

FIG. 14 is a view in elevation of an intermediate cathode after it has been pressed and given a permanent set in the press: certain lines in this view being exaggerated for illustrative purposes;

FIG. 15 is a fragmentary view in elevation and to enlarged scale of the face of a pressed intermediate cathode, certain lines of this view being exaggerated for illustrative purposes;

FIG. 16 is a view in section on line 16—16 of FIG. 15; and

FIG. 17 is a view in section on line 17—17 of FIG. 15.

Figure 1:
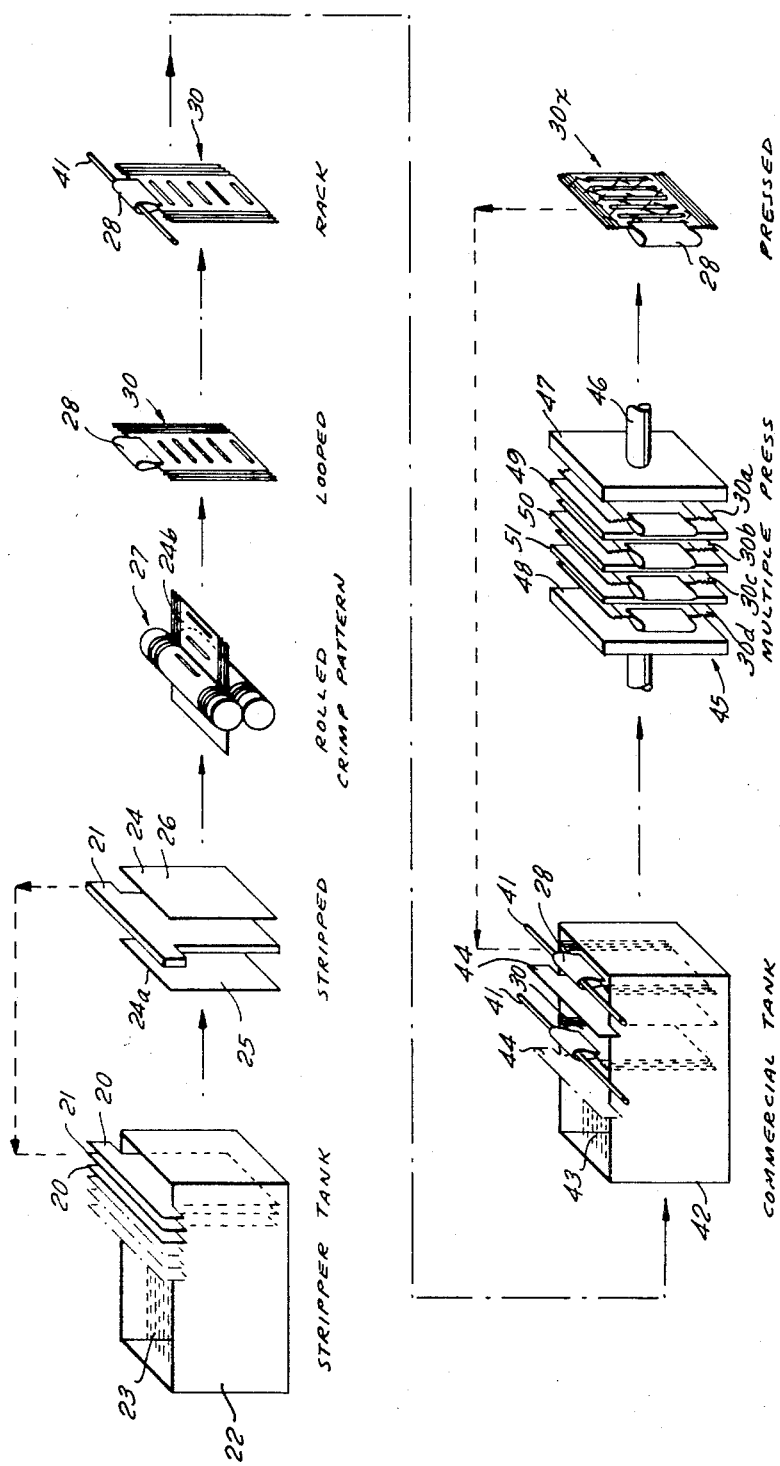
FIG. 1 is a view largely diagrammatic and in the nature of a flow diagram showing various sequential steps of a preferred way of carrying out the aforementioned method.

Referring now to the drawings in which like reference characters indicate like parts throughout the several views, the process is illustrated in diagrammatic fashion in FIG. 1. Directing attention to FIG. 1, starting sheets are first prepared in a known manner by depositing copper from anodes 20 onto both sides of a mother plate 21 in a stripper tank 22 containing electrolyte solution 23; the surfaces of the mother plate being smooth and having been lubricated by a lubricant or treated with a parting agent of known kind. After a deposit of copper has been plated on to the mother plate from the anodes, the plate is removed and washed. The deposited copper is removed by use of a stripper tool, producing in known manner, two thin sheets 24, 24a; one from each side of the mother plate. The stripped sheet is smoother on the side 25 next to the mother plate as compared to the opposite side 26 and is harder on the smooth side 25 than on the copper-deposited side 26. In the plating and stripping operations, various stresses and strains have been set up in various localized areas in the thin sheet.

Although the composition of the electrolyte solution which is circulated through the stripper of the sheet stripped from the mother plate may vary in nominal thickness, it is preferred to produce a thin sheet of from about 0.030″ to 0.035″ in thickness and to use an electrolyte solution in the stripper tank according to the following:

Copper—42 grams per liter (3½%)
Free acid—143 grams per liter (12%)
Chlorine—.021 gram per liter (.0018%)
Glue—.075 lb. per ton
Inhibitor (surface active agent)—.068 lb. per ton
Circulation rate—4 gal. per minute
Inlet temperature—140° F.
Outlet temperature—133° F.
Current density—22.77 amps per sq. ft.
Nominal thickness of starting sheet produced—.030″–.035″
Weight of starting sheet—13½ lbs. (plus or minus ½ lb.)

Anodes in the stripper tank are positioned on 4½″ centers and the mother cathode plates are spaced in the center of adjacent anodes.

It will be understood that the above is the presently preferred practice. Variations, known in the art, may be employed for producing the thin starting sheets.

After the sheets 24, 24a are stripped, they are then subjected to a levelling and straightening operation. Although there are numerous devices for performing this operation and for producing various kinds of crimps, creases or other patterns in the sheets, all of which are within the contemplation of the process, the present preferred practice is to pass the stripped thin copper sheets through rollers, such as a rolling mill 27 (shown diagrammatically in FIG. 1). This rolling operation straightens or levels the thin sheet (now designated 24b). By reason of the surface pattern of the rolls, the copper sheet on passing through the rolls is given a crimp pattern; after which a loop 28 of the same material is attached by a looper machine to the upper end portion. The thin, straightened, crimped and looped sheet is designated by reference numeral 30 in FIG. 1. The levelled, crimped and looped starting sheet is then suspended on a suspension bar 41 of conductor metal, such as copper, and is loaded into commercial electrolyte tank 42 containing electrolyte solution 43. It will be understood, of course, that each commercial tank in a commercial plant will accommodate a number of starting sheets 30 interposed between copper anodes 44, which, as well known, contain other metal values. In commercial tanks commonly used, the anodes are positioned on 4″ centers and the cathode sheets are positioned in the center of the space between adjacent anodes. The positioning of anodes and cathodes may vary somewhat from plant to plant.

The preferred starting sheets used in practicing the process are illustrated in FIGS. 2, 3 and 4, which show a starting sheet after it has been levelled, crimped and looped, and prior to loading it in the commercial tank. As shown, the starting sheet has a nominal thickness of 0.030″–0.035″. It is crimped at its vertical edge portions to provide a plurality of crimps 31, 31a, there being, as shown, four such crimps on each side. The vertical side edge portions terminate in a narrow vertical flat portion 32, 32a. The area 33 between the crimped edge portions which lies in the same plane as the vertical flat edge portions 32, 32a, has a plurality of spaced horizontal embossed crimps 35a, b, c, d, e, f, g, h; which terminate short of the crimped edge portions 34, 34a. As illustrated in FIGS. 2, 3 and 4, alternate horizontal crimps 35a, c, e, g have their crests extending to one side of the main plane of the sheet and the other horizontal crimps have their crests extending to the other side. The loop 28 is secured to the upper horizontal edge portion in a punching machine by punching through the three layers of copper and peening over the protruding sharp metal portions as shown at 36. As shown, the width of the starting sheet 30 from vertical edge 37 to vertical edge 37a is 37½″; the height from bottom edge 38 to top edge 38a is 37½″; and the loop is 18″ long. The depth of the horizontal crimps 35a, b, c, d, e, f, g, h is 0.028″–0.032″, and the length of each is about 33¾". The depth of vertical crimps 34, 34a from crest 39 to valley 39a (see FIGS. 2, 3 and 4) is 0.078"–0.082"; the distance from crest 39 to crest 40 is 0.373"–0.377".

It will be understood that the sheet, as shown, illustrates a typical starting sheet, which is presently preferred. But the method contemplates other sizes and other patterns of crimps in the starting sheet, if desired. It is significant to note, however, that the starting sheet should not have crimps or other protuberances which extend beyond the main plane of the sheet in such fashion as to form ledges or shelves, or other protuberances upon which slimes can collect, or settle, because the slimes usually contain precious metal values and should fall and settle to the bottom of the electrolytic tank during the electrolytic process conducted in the tank. And in some instances, starting sheets stripped from the mother plate, without rolling, levelling or crimping, may be loaded into the commercial tanks.

The composition of the electrolyte solution in the commercial tanks of different plants may differ somewhat and the use of different electrolytic compositions is within the contemplation of the invention. For optimum conditions for producing commercial cathodes, it is presently preferred to circulate an electrolyte solution in the commercial tank having a composition as follows:

Electrolyte

| | | |
|---|---|---|
| Sulfuric acid content | percent | 18½ |
| Copper content | do | 3.60 |
| Chlorine content | do | .00250 |
| Temperature | °F | 150 |
| Glue | lbs. per ton of copper | .0736 |
| Inhibitor | do | .0736 |

After the starting sheets 30, as described above, are prepared, they are then loaded into the commercial tanks of known or conventional construction; such tank 42 being diagrammatically illustrated in FIG. 1; the anodes being positioned on 4" centers; and the starting sheets being positioned between adjacent anodes. Current is turned on as in conventional practice and a suitable current density is employed, such as 20.25 amps./sq. ft. (amperes per square foot). In conventional processes, the thin starting sheets after a short period of time, say within a day's time, have a tendency to, and very frequently do, warp or bend or otherwise get out of flattened or straightened shape, causing short circuits and frequently causing uneven copper deposits on the cathode sheet. These drawbacks require much manual work by hot sheet men to make adjustments of the position of the cathode sheets and require other work to prevent or to minimize short circuits and uneven copper deposition on the cathode starting sheets. It is at this early stage of the electrolytic process that the process departs in significant and material respects from prior practice, and it is at this stage that the apparatus provided by this invention is advantageously used.

After the starting sheets have a layer of copper deposited on both sides of the starting sheet in the commercial tank, so that the cathode sheets have a deposit of copper of substantial thickness of substantially uniform characteristics on both sides, they are removed from the commercial tank, washed, if desired, and subjected to a pressing and cold working to straighten and stiffen them and to give them a permanent set. The pressed cathode sheets are then returned to the commercial tank, as described in further detail hereinafter. The desired condition, that is, when the sheet is amenable to the further treatment herein described, is usually reached when the starting sheets have obtained a thickness which is 2½ to 3½ times the thickness of the starting sheets which initially had a nominal thickness of 0.030"–0.035". The amount of deposition of copper is usually accomplished within a period of about a day after the thin starting sheets were loaded into the commercial tanks. It has been found in the practice of the method that after a 24 to 27 hour commercial deposit of copper on the initial starting sheet, there is a sufficient commercial deposit of copper on both sides of the starting sheet, to proceed with the pressing of the thicker cathode sheet, as described hereinafter. The cathode sheet at this stage should have a thickness of about 0.09"–0.10", and for convenience of description, it is herein designated as an "intermediate cathode". Although an intermediate cathode having the thickness mentioned above is presently preferred, it will be understood that the process contemplates, within certain limits, thicker or thinner intermediate cathode sheets.

Whereas the initial starting sheet is thin and has a tendency to springiness, the intermediate cathode sheet at this intermediate stage of the electrolytic process has a layer of substantial thickness of deposited copper of substantially uniform characteristics on both sides of the cathode sheet and it has sufficiently body and has become sufficiently annealed by the heat of the circulating electrolyte solution that it is amenable to being cold worked. It is then cold worked in a platen press in a manner to simultaneously stress the heavier intermediate cathode sheet beyond the elastic limit of the metal in adjacent areas or loci over substantially the entire planar area of the intermediate cathode sheet, with the result that the sheets are given a permanent set. And these pressed intermediate cathodes are then returned to the commercial tank and will remain straight after they are returned to the commercial tank, up to the time the cathode becomes a finished cathode of commerce.

Furthermore, by the use of a multiple platen press, a plurality of intermediate cathode sheets may, if desired, be simultaneously cold worked and pressed to give them a permanent set in one operation, thereby increasing overall efficiency in the production of finished commercial copper cathodes of commerce.

The pressing and cold working of the intermediate cathodes is indicated in FIG. 1, wherein is diagrammatically illustrated a multiple platen press 45 having a power driven reciprocatable ram 46 secured to a movable end platen 47, a fixed table platen 48, and a plurality of movable intermediate platens 49, 50, 51. A plurality of intermediate cathodes 30a, b, c, d, are shown in place in the press 45 between the platens which are in open position and prior to pressing the sheets in the multiple platen press. The construction of the press is described in further detail hereinafter.

After pressing and cold working the intermediate cathode sheets 30a, b, c, d, to impart to them a permanent set, the individual sheets, which now for convenience of description are designated by reference character 30x, are herein called a "pressed intermediate cathode". A preferred form of the pressed intermediate cathode is described in further detail hereinafter. The pressed intermediate cathodes, now straight, stiff and having a permanent set, are returned to the commercial tank 42; properly positioned between the anodes 44 and remain there until a sufficient body of copper is deposited on them to produce finished cathodes of adequate thickness for finished copper cathodes of commerce.

The pressed and cold worked intermediate cathodes are not subject to the unwanted bending, warping and distortion characteristic of the cathode sheets employed in prior practices. By the practice of the process, much of the arduous manual work of the hot sheet men that was necessary under prior practices is eliminated or reduced to a minimum.

The multiple platen press 45 (see FIGS. 5 and 6, but shown diagrammatically in FIG. 1) for pressing and cold working the intermediate cathode sheets comprises a stationary hydraulic cylinder 56, a ram 46 reciprocatable in the cylinder, a stationary end platen plate 48 mounted on a fixed vertically disposed table 48a on the press frame, a movable end platen plate 47 secured to a vertically disposed movable table 47a, in turn secured to the reciprocatable ram 46, and movable, intermediate platen plates 49, 50, 51 suitably mounted and positioned between the end platen plates 47, 48. An hydraulic system S, including a pump P (shown conventionally) furnishes power means for operating the press. The main stationary end casting 57 of the frame, mounting the hydraulic cylinder 56, is tied to the main stationary end casting 58 by means of an upper reinforcing stay-bar 59 and a lower reinforcing stay-bar 60. The vertically disposed intermediate platen plates 49, 50, 51, and the end platen plates 47, 48 are provided with face plate tooling, later to be described.

Figure 5:
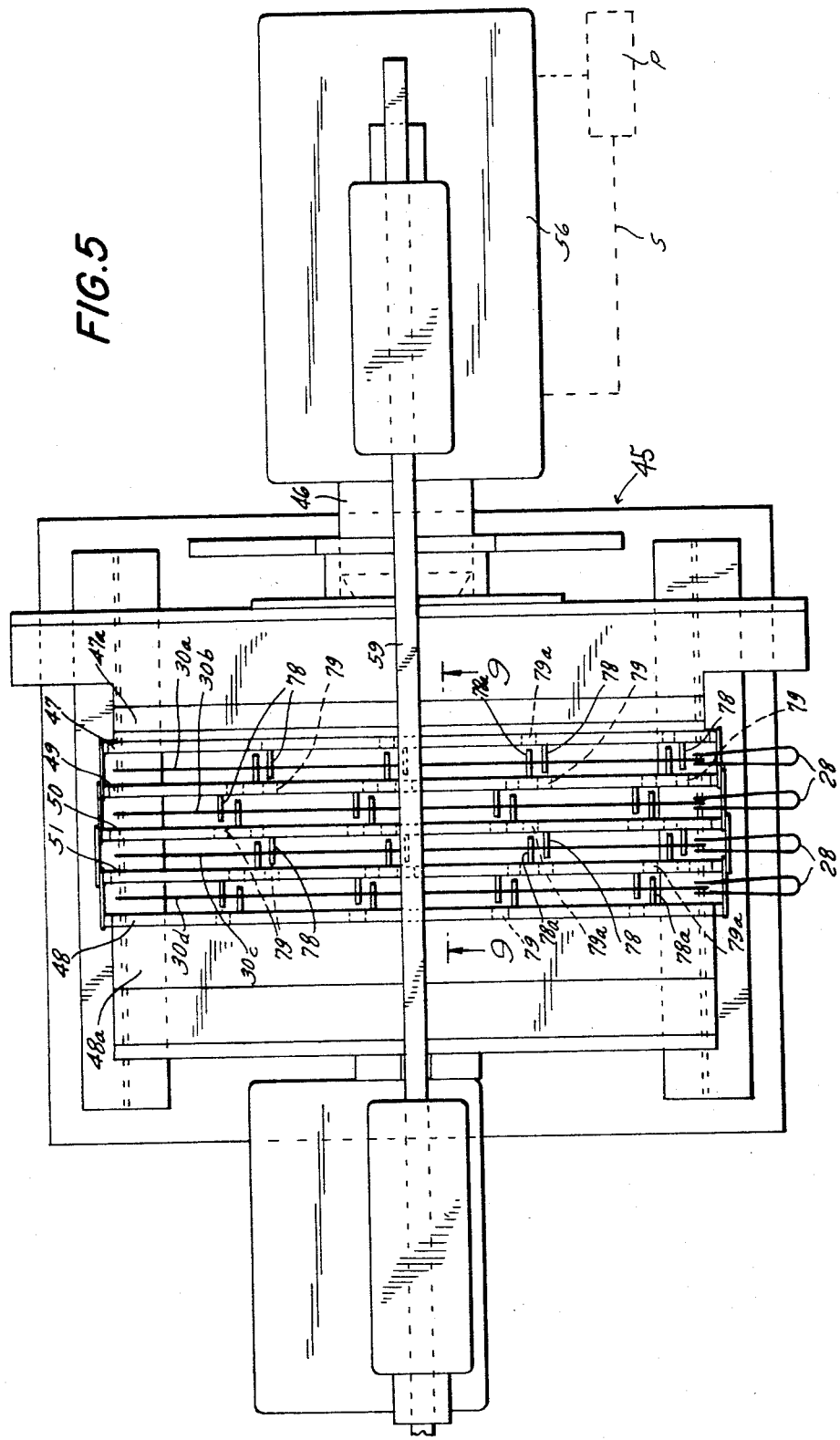
FIG. 5 is a top plan view of a multiple platen press for pressing intermediate cathode sheets, showing the sheets in place for pressing, with the pressing platens in open position.
Figure 6:
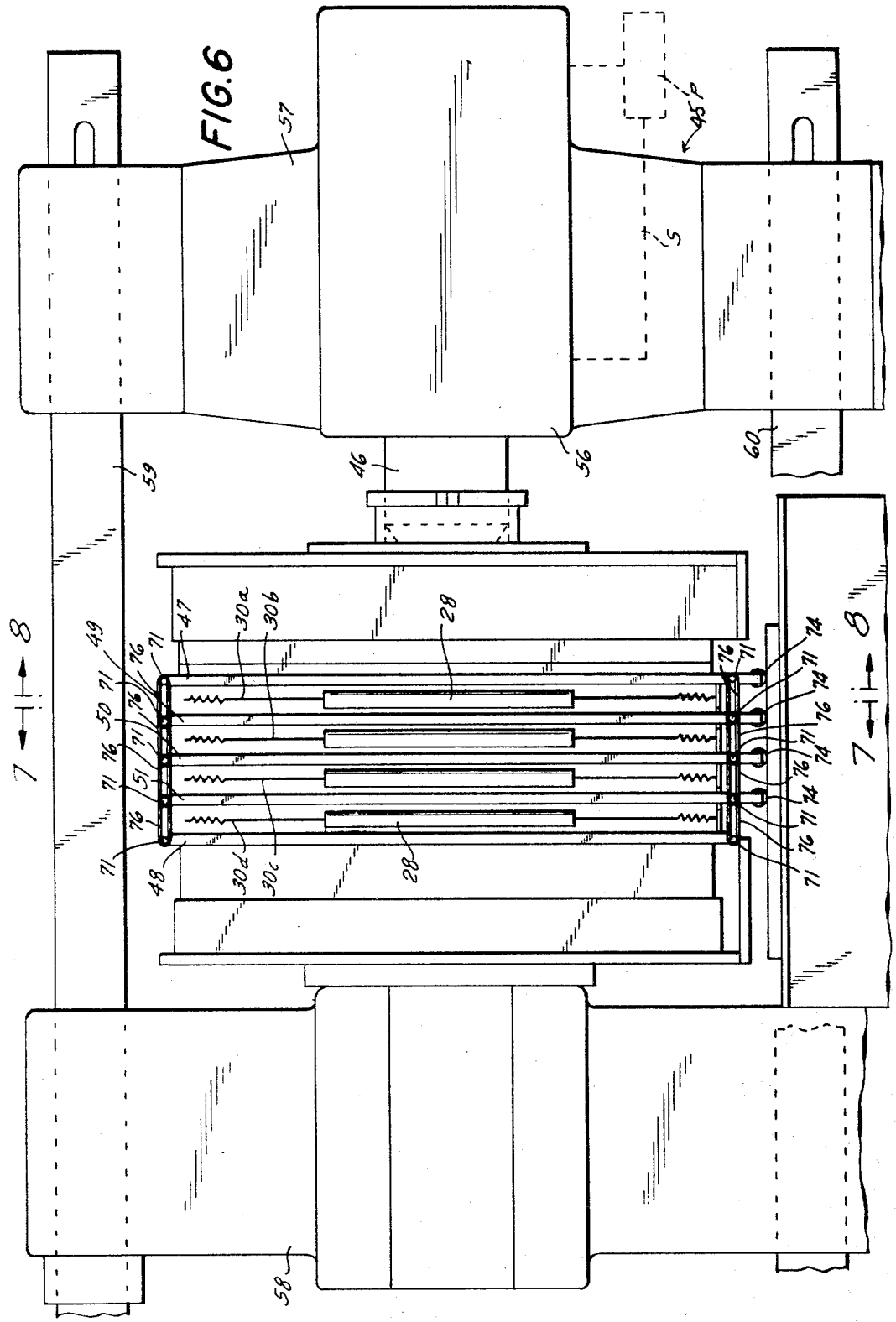
FIG. 6 is a side view in elevation of the press shown in FIG. 5 showing the sheets in place for pressing, with the pressing platens in open position.

Secured to each vertical edge of the movable platen plates 47, 49, 50 and 51, at the lower and upper ends, are outwardly extending link-mounting pins 71. Stationary platen plate 48 also has outwardly extending link-mounting pins 71. Platen plate members 47, 49, 50 and 51 at their lower ends at each vertical edge have secured thereto brackets 73, 73a (see FIGS. 7 and 8) upon which are rotatably mounted platen supporting rollers 74, 74a. These rollers 74, 74a roll on trackways 75, 75a mounted on the upper flanges of I-beams 67, 68, secured to the base plate 69. Mounted on the link-mounting pins 71 at the upper ends and at the lower ends of platen plate members 47, 48, 49, 50 and 51 on both sides of the press, are oblong links 76 (see FIGS. 6 and 9) which permit the forward and rearward movement of the movable platen plates; thus permitting the movable platen plates to move forwardly to closed position, as shown in FIG. 10, and to move rearwardly to open position as shown in FIGS. 5, 6 and 9. The links 76 provide guides and stop members for limiting the travel of the movable platens when the press is being operated to open position and to closed position.

Figure 13:
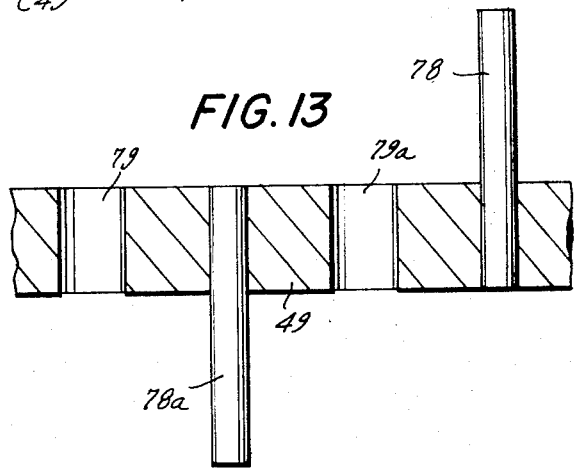
FIG. 13 is a view in section on line 13—13 of FIG. 11 showing guide pins and guide pin recesses.

Mounted in horizontal alignment on the platen plates 47, 49, 50, 51 at their lower end portions are forwardly extending pins 78 which register with apertures 79 in the opposite platen plates (see FIGS. 5 and 9). In platen plates 49, 50, 51, 48 are rearwardly extending pins 78a in horizontal alignment, which register with apertures 79a in their opposed platen plates. There are a plurality of these sheet supporting pins in horizontal alignment on each platen plate. They serve as aligning and positioning supports for the cathode sheets 30a, b, c, d, when the sheets are loaded into the open press. The sheets are loaded into the open press from the side. These supporting pins maintain the sheets properly positioned in the press, with the edge of the sheet resting on them, during the movement of the platens to closed position. It will be observed that in moving the platens to closed position, the pins may move without obstruction into the opposed registering apertures in the adjacent platen (see FIGS. 9 and 10). A further detail of the mounting of the sheet supporting pins is shown in FIG. 13; this view showing a typical mounting. The pins are press-fit. Forwardly extending pin 78 in platen plate 49 extends and registers with aperture 79 in platen plate 50. Rearwardly extending pin 78a is mounted in similar fashion. The apertures 79a register with rearwardly extending pins mounted on the opposed platen plate.

Figure 7:
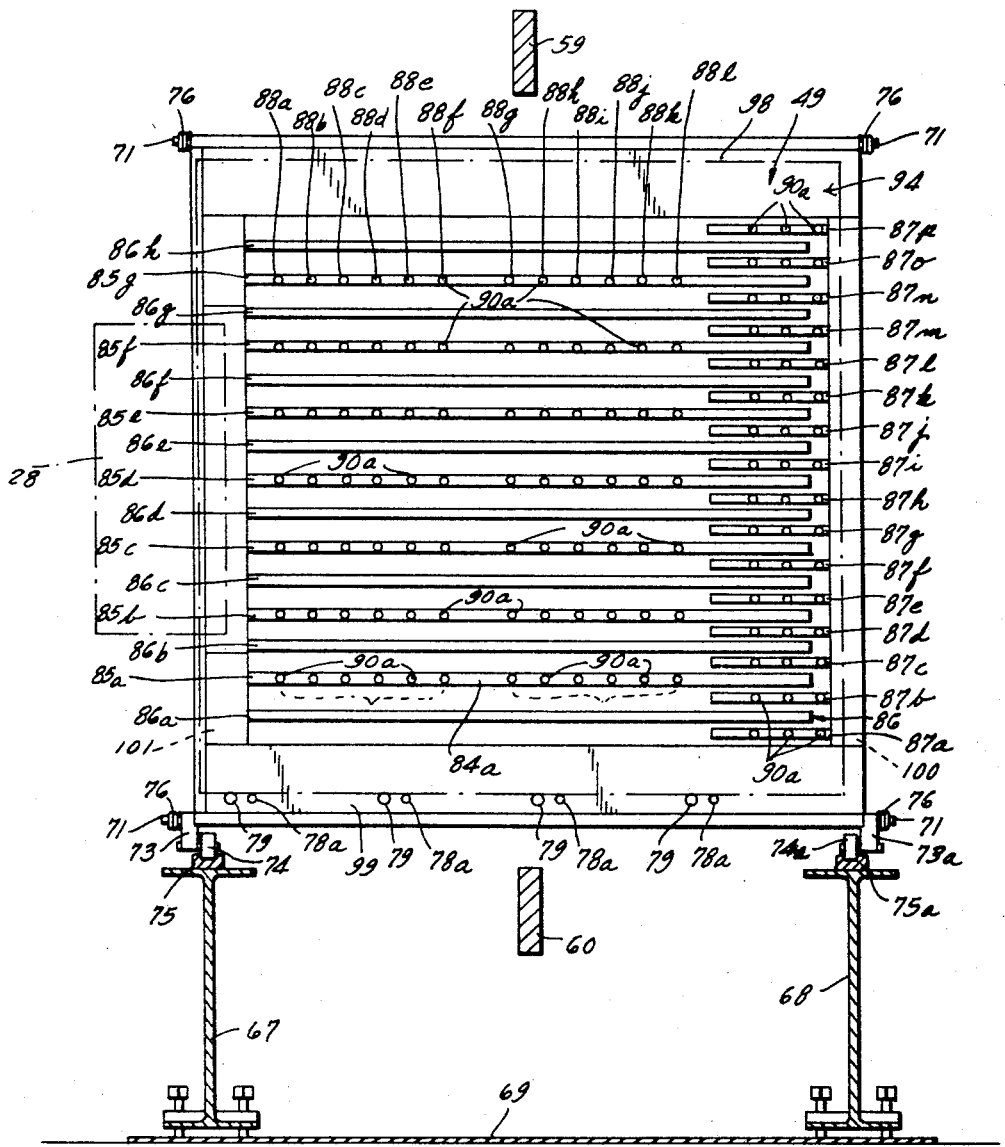
FIG. 7 is a view in elevation on lines 7—7 of FIG. 6, partly in section, showing a preferred form of working face of a platen.
Figure 8:
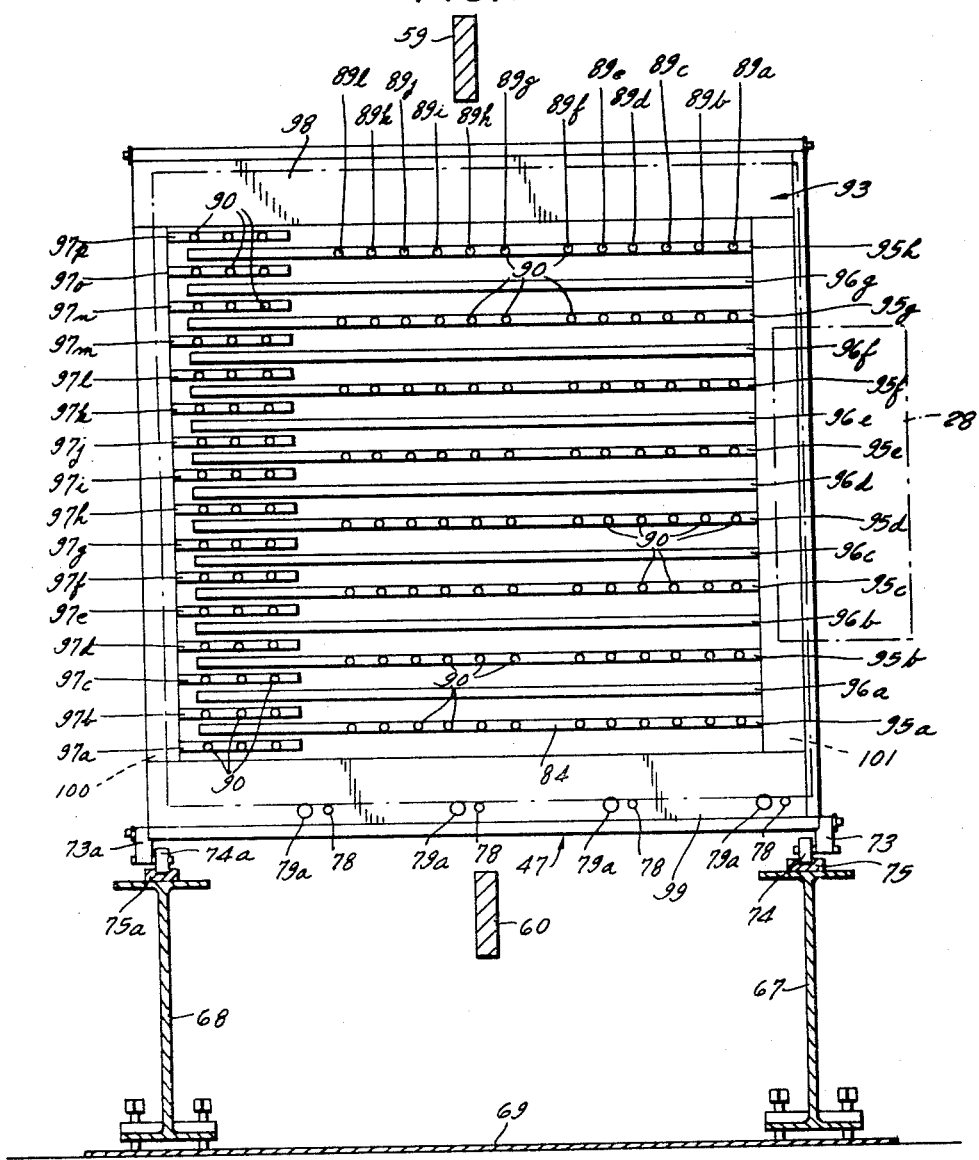
FIG. 8 is a view in elevation on line 8—8 of FIG. 6, partly in section, showing the working face of the platen opposite the platen shown in FIG. 7.
Figure 9:
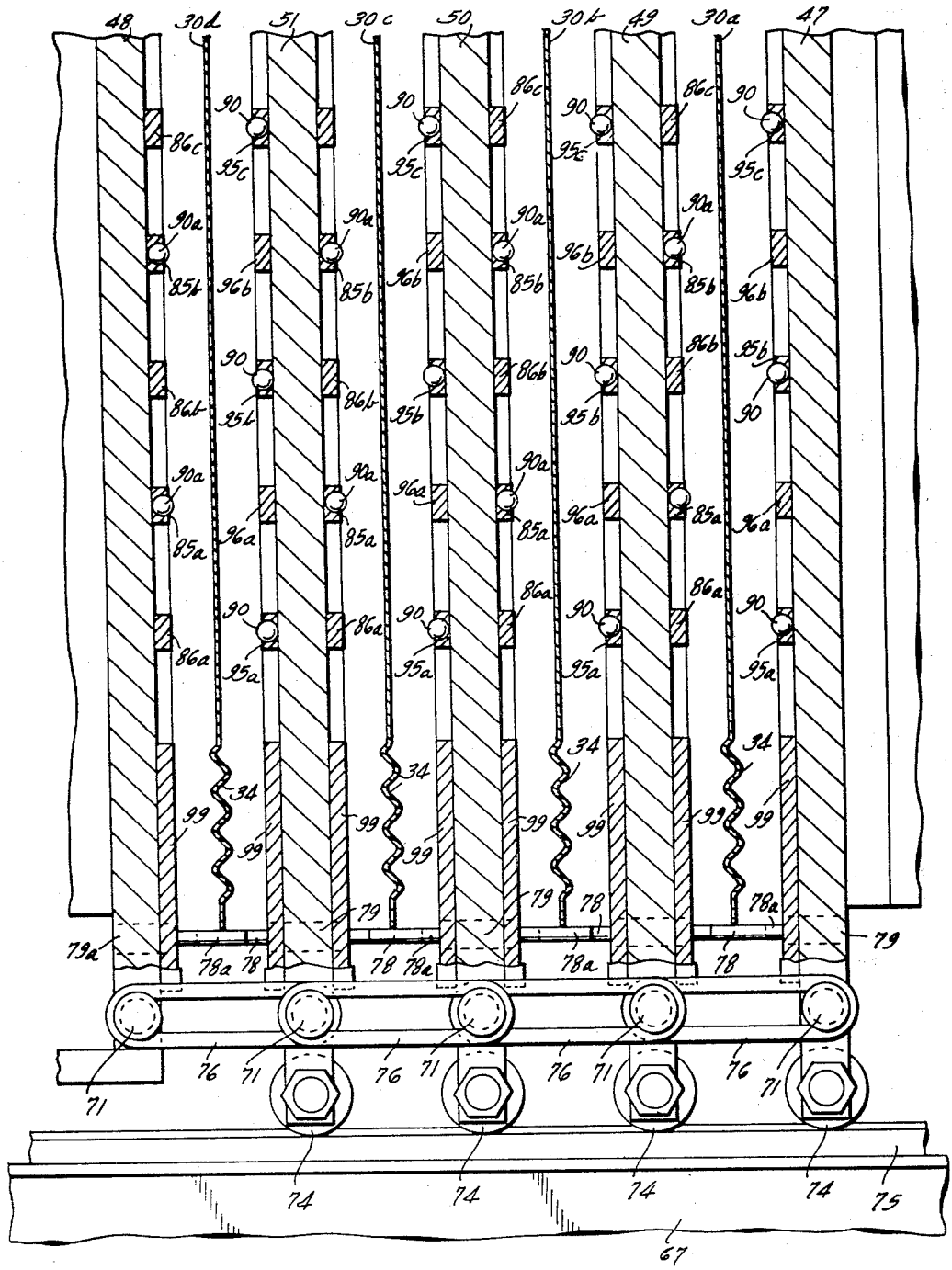
FIG. 9 is an enlarged fragmentary side view in elevation and partly in section on line 9—9 of FIG. 5 showing the intermediate cathode sheets in position to be pressed, with the platens open.
Figure 10:
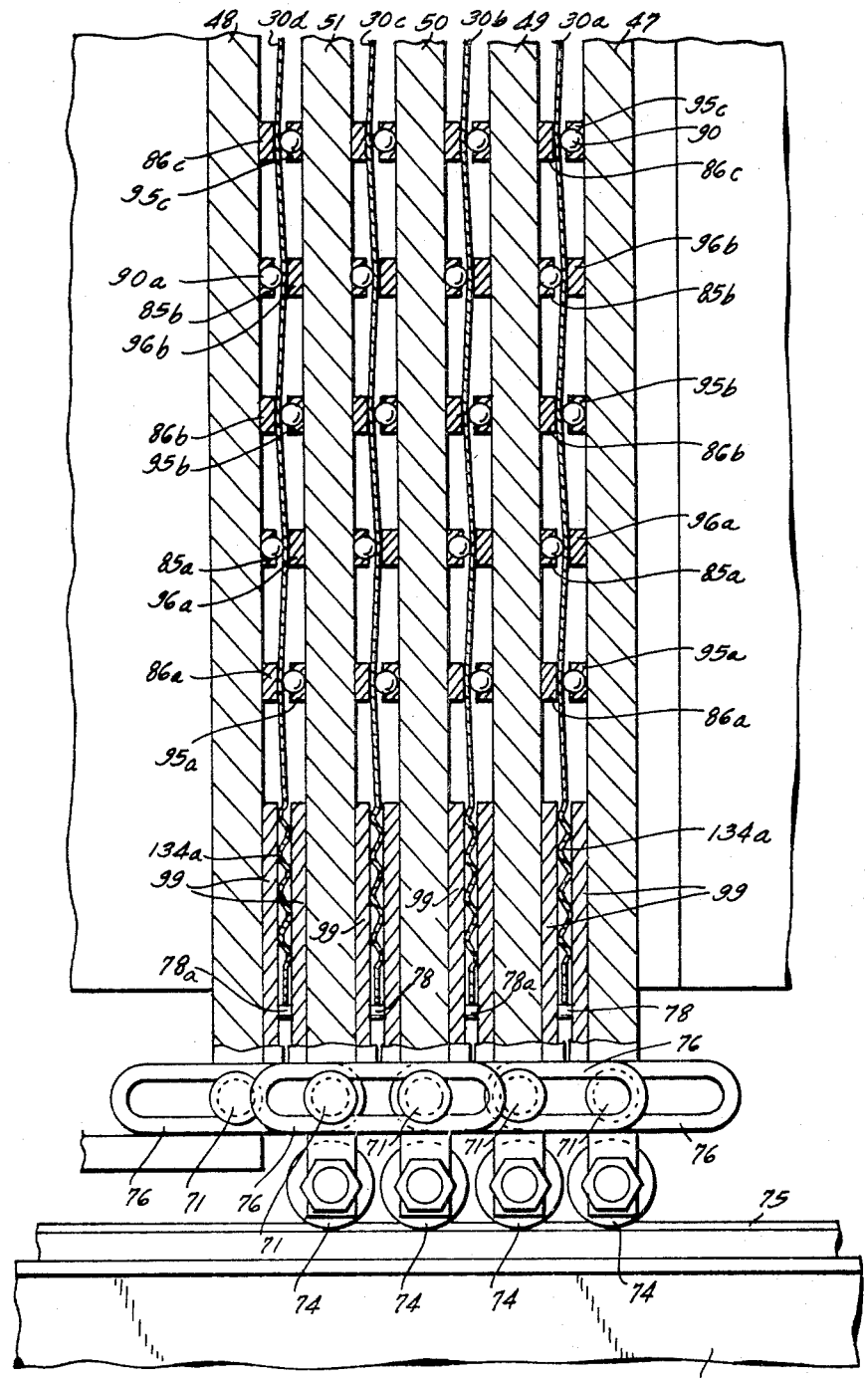
FIG. 10 is a view similar to FIG. 9 but showing the platens in closed positions.

Each of the platen plate faces is provided with tooling, herein for convenience of description, called "face plate tooling." The face plate tooling is perhaps best shown in FIGS. 7 to 12. Referring to FIG. 7, which shows a typical face plate tooling on platen plate 49 (on line 7—7 of FIG. 6), there are mounted on the face of platen plate 49 a plurality of spaced horizontally disposed main strip bars 85(a–g) herein called "main ball-retaining strips" and a plurality of spaced main strips bars 86(a–h), herein called "main backing strips." Inasmuch as all the face plate tooling on the platen plates which face in the same direction are similar, it will suffice to describe only one of these as typical. As shown, in FIG. 7, there are seven horizontally disposed main ball-retaining strips 85a to 85g, and eight main backing strips 86a to 86h. There are sixteen shorter, horizontally disposed, strip bars 87(a–p) mounted on platen plate 49; these bars being herein called "minor ball-retaining strips." These shorter strips 87a to 87p are mounted intermediate the main ball-retaining and main backing strips, as shown in FIG. 7.

The ball-retaining strips mount balls 90a, which are made of hard material. As shown, the balls 90a are made of chrome steel alloy and are $11/32''$ in diameter. For convenience of description, the balls which are mounted in the rearward faces of the platen (as exemplified in FIG. 7) are designated by reference numeral 90a and those mounted on the forward faces of the platens (as exemplified in FIG. 8) are designated by reference numeral 90. However, balls 90 and 90a are of the same kind and size. The main strips 85(a–g) and 86(a–h), as shown, are $1/4''$ thick, $1/2''$ wide, and 33" long. The minor strips 87(a–p) are $1/4''$ thick, $1/2''$ wide, and 7" long. The strips on the forward faces of the platen plates are of like dimensions.

The manner of mounting the steel balls in a ball-retaining strip is perhaps best shown in FIG. 12, wherein is shown a fragmentary view, in section, of typical platen plate 49, having secured thereto ball-retaining strip 85a, and others as will be described later on. In order to mount a ball 90a, a cylindrical bore just large enough to receive the ball is made through the strip, the ball inserted in the bore and the metal at each end of the bore is staked so that the spherical surface of the ball 90a extends beyond the surface 91 of the strip a suitable distance. The ball will be retained in the strip because it is staked in. In the platens, as shown, the balls 90, 90a extend beyond the surface 91 of the strips a distance of $3/32''$ inasmuch as the strips are $1/4''$ thick and the balls have a diameter of $11/32''$. After the required number of balls are staked into the required number of bores in the strip, the strip is then secured in place on the platen plate by suitable means, such as flat head screws 92 (see FIG. 11). The balls 90, 90a in the main ball-retaining strips in the press, as shown, are spaced on two inch centers, as described hereinafter.

The face tooling opposed to the face tooling on the forward faces 93 of the platens (see FIG. 8) is of similar design as the rearward faces but the steel embossing balls 90 are offset from the balls 90a. That is, balls 90a of the face tooling on the rearward faces 94 (see FIG. 7) of the platens are offset from the balls 90 on the opposite forward faces 93 (see FIG. 8) of the platen. Also, the main ball-retaining strips are vertically offset from the main ball-retaining strips on the opposed platen face. For example, FIG. 8 shows a view in elevation on line 8—8 of FIG. 6, this showing the forward face 93 of platen plate 47; whereas FIG. 7 shows a view in elevation on line 7—7 of FIG. 6; this showing the rearward face 94 of platen plate 49, which face is opposed to the face 93 shown in FIG. 8. It will be understood, from the description herein, that when the press is moved to closed position, faces 93 and 94 apply their forces in a direction perpendicular to the plane of the sheets between them; as hereinafter described in further detail.

All rearward face plates 94 are tooled in similar manner. Also all forward face plates 93 are tooled alike.

Referring to FIG. 8, showing a typical front or forward face tooling there are mounted on the front face 93 of platen plate 47 a plurality of spaced horizontally disposed main ball-retaining strips 95(a–h) and a plurality of spaced horizontally disposed backing strips 96(a–g). As shown, there are eight main ball-retaining strips 95a to 95h, and seven main backing strips 96a to 96g. There are sixteen shorter, horizontally disposed minor ball-retaining strips 97a to 97p. These ball-retaining strips 97a to 97p contain three spaced embossing balls 90, and their opposed corresponding ball-retaining strips 87a to 87p (see FIG. 7) also contain three balls 90a, but the balls are horizontally offset so that they do not register with each other, when the press platens are closed.

It will also be observed that the main ball-retaining strips 95a to 95h (see FIG. 8) are vertically offset from the main ball-retaining strips 85a to 85g (see FIG. 7). However, ball-retaining strips 85a to 85g on the rearward faces 94 of the platen plates are opposite the backing strips 96a to 96g on the forward faces 93 of the platens. This is perhaps best shown in FIG. 12, which is a fragmentary view to larger scale on line 12—12 of FIG. 11; which in turn is a fragmentary view in elevation of the rearward face 94 of a typical platen 49.

In the press, as shown, the main ball-retaining strips 85a to 85g on the rearward faces 94 of the platens (see FIG. 7) are spaced on 4" centers; and the backing strips 86a to 86h are spaced on 4" centers. Each of the main ball-retaining strips 85a to 85g have mounted thereon two sets of six balls 90a on 2" centers, leaving a 4" space 84a between the two sets. Hence, the balls are spaced to provide a plurality of rows of embossers 90a corresponding to the ball-retaining strips 85a to 85g, and said embossers are arranged in a plurality of rows, 88a to 88l, perpendicular to rows 85a to 85g. Likewise, the main ball-retaining strips 95a to 95h on the forward faces 93 of the platens (see FIG. 8) are spaced on 4" centers; and the backing strips 96a to 96g are spaced on 4" centers. Each of the main ball-retaining strips 95a to 95h have mounted thereon two sets of six balls 90 on 2" centers leaving a 4" space 84 between the two sets. Hence, the balls are spaced to provide a plurality of rows of embossers 90 corresponding to the ball-retaining strips 95a to 95h and said embossers are arranged in a plurality of rows 89a to 89l. The balls and strips on the forward faces 93 are offset from the balls and strips on the rearward faces 94 as described hereinafter.

Figure 11:
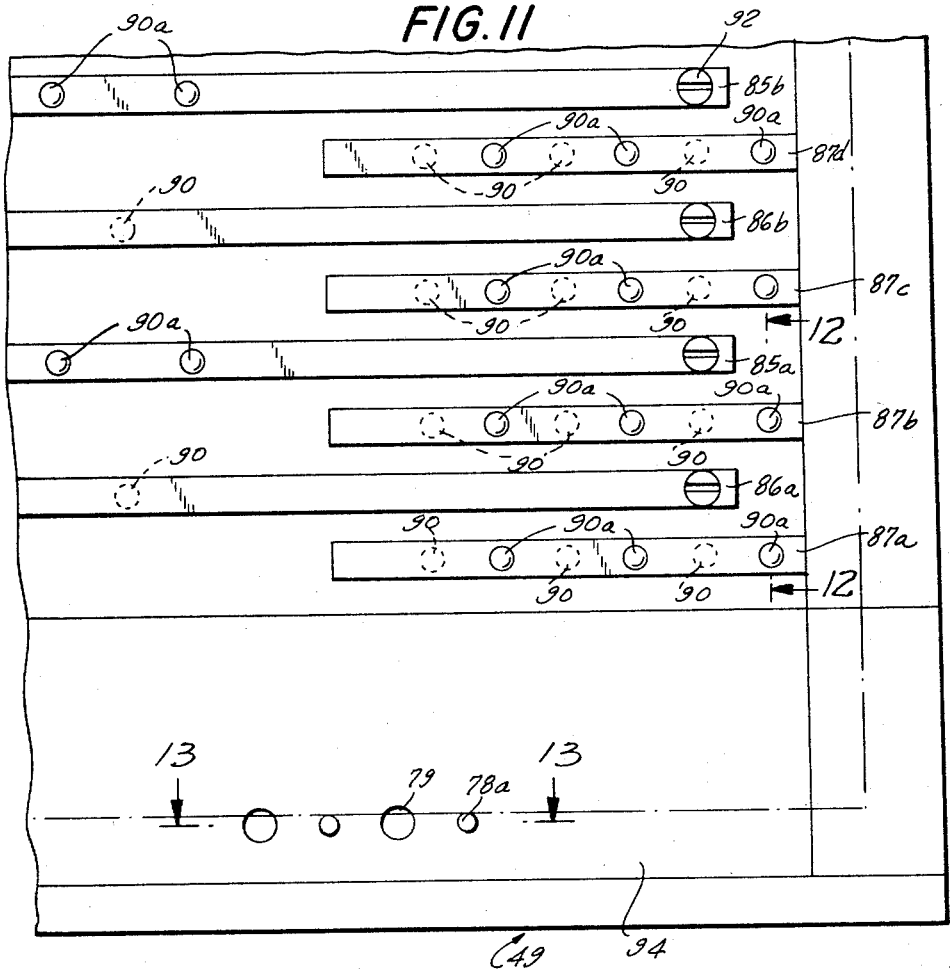
FIG. 11 is an enlarged fragmentary view in elevation showing the arrangement of the tooling of the face plate of a platen.
Figure 12:
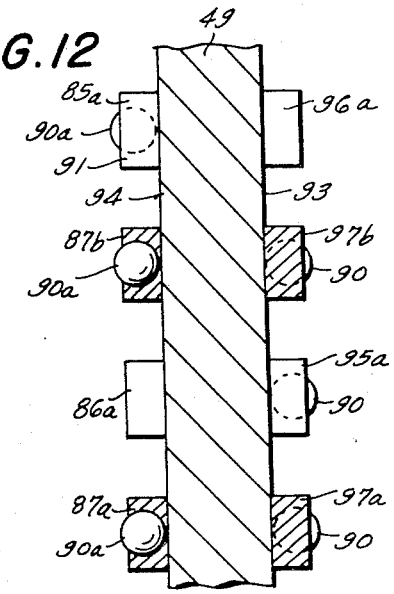
FIG. 12 is a view in section and to larger scale on line 12—12 of FIG. 11, showing the manner of mounting steel balls which serve as embossing protrusions.

Referring to FIGS. 11 and 12, it will be observed that on platen plate 49 there is a lowermost minor ball-retaining strip 87a on the rearward face 94 and a lowermost minor ball-retaining strip 97a on the forward face 93 at the same height. There are similar minor strips 87a to 87p and 97a to 97p on the platen faces (see FIGS. 7 and 8). Strips 87a to 87p each have three spaced protruding embossing balls 90a on 2" centers and strips 97a to 97p each have three spaced protruding embossing balls 90 on 2" centers, but the balls are horizontally offset. Hence, when the platens of the press are in closed position, the balls 90 and 90a are in the position with relation to each other as illustrated in FIG. 12; the balls 90 pressing on one side of the cathode sheet, that is being pressed, and the balls 90a pressing on the other side of the sheet.

On the other side of the platen plates from the side which mount the main ball-retaining strips 85a to 85g on the rearward faces 94 of the platen plates, are backing strips 96a to 96g which are mounted on the forward faces 93 of the platen plates. And on the rearward faces 94 of the platen plates are main backing strips 86a to 86h, and on the other side, that is, on the forward faces 93, are main ball-retaining strips 95 to 95h (see FIGS. 7, 8, 11, 12). The balls 90 in the main ball-retaining strips on the forward faces 93 are horizontally offset from the balls 90a in the main ball-retaining strips on the rearward faces 94, as illustrated in FIG. 11. When the platens are in closed position, the balls 90 in the main ball-retaining strips of the forward faces 93 press on one side of the cathode sheets 30a, b, c, d (see FIGS. 9 and 10), and the balls 90a in the main ball-retaining strips of the rearward faces 94 press on the other side of the sheet.

In the foregoing there has been described one form and manner of making the face plate tooling faces wherein steel balls are maintained in ball-retaining strips. However, other means for providing spaced embossers, having exposed spheroidal embossing surfaces, may be employed. For example, rows of round head rivets of hard steel or other suitable metal may be secured to the platen faces and arranged to provide spheroidal or otherwise rounded or pointed embossing surfaces which will serve as embossers in lieu of the spheroidal surfaces of steel balls mounted in ball-retaining strips and described above in detail. And in the light of the above description, other suitable embossers serving a like purpose will suggest themselves. Also, in certain instances, the spacing of the embossers may be varied from that shown in the drawings; the significant thing being to space the embossers so that they emboss the intermediate cathode sheet in adjacent small areas or loci over substantially the entire planar area of the sheet so that the metal in those areas is stressed beyond its elastic limit and cold worked to give the sheet a permanent set in those areas.

Steel shim pads 98 and 99 are provided on the faces of the platen plates, at the top and bottom edge portions of the plates. These pads are in a position so that they contact the crimped edge portions 134 and 134a of the intermediate cathode sheets 30a, b, c, d when the press is closed and upset them a certain amount. Also, steel shim pads 100 and 101 are provided on the faces of the platen plates; pads 101 engaging the top or looped end portion and pads 100 engaging the bottom edge portion of the intermediate cathode sheets when the press is in closed position.

The multiple platen press may be operated to press and cold work intermediate cathode sheets as follows:

It will be borne in mind that the intermediate cathode sheets are sheets which initially were thin cathode starting sheets which have been in the commercial tanks for a period of time sufficient to build up a commercial deposition of copper on both sides of the sheet so that the sheet is 2½ to 3½ times thicker and correspondingly heavier than the initial thin starting sheet. The time required to build up this additional body of deposited copper on the startng sheet is about a day; these sheets sometimes being called "day old" sheets in the parlance of the trade. The thickness of these intermediate cathode sheets, in accordance with the presently preferred practice, is from 0.09"–0.10" in thickness; this thickness being reached in about 24 to 27 hours in the commercial tank. It will be understood that there may be a variance in this time and there may be a variance in thickness at different areas of the sheet and also that the process is applicable to sheets of greater or lesser thickness; within a range of .075" to .12" or even thicker. The significant thing is that there be a layer of substantial thickness of electrolytically deposited copper on both sides of the initial starting sheet so that the intermediate cathode sheet has a substantial layer of deposited copper on both sides of the sheet, each of said layers having substantially uniform characteristics, and it is important that the sheets be amenable to cold working to give them a permanent set when they are pressed in a suitable press.

These intermediate cathode sheets (the "day old" sheets) are then loaded into the press when the platens are in open position. For illustrative purposes it may be assumed that intermediate cathode sheets 30a, b, c, d, are loaded from the side of the press when it is in open position, as illustrated in FIGS. 6 and 9. The vertical edges of the sheets will rest upon gauge pins 78, 78a. The sheets are registered between the press platens so that the bottom and top edges of the sheets are aligned.

Ram 46 is then caused to move in its forward stroke in the cylinder 56 by means of the pump P in the hydraulic system S. The movable platens 47, 49, 50, 51 move forward from open position, as illustrated in FIGS. 5, 6 and 9, to closed position, as illustrated in FIG. 10. In so doing, each intermediate cathode sheet is subjected to forces acting in a direction perpendicular to the plane of the sheet and these forces are uniformly distributed and act simultaneously over the entire planar area of the sheet. The protruding spheroidal surfaces of the balls 90, acting as embossers, engage the surface of the sheet on one side and the protruding spheroidal surfaces of the balls 90a, acting as embossers, engage the surface of the sheet on its other side. See, for example, FIGS. 9 and 10 which, for illustrative purposes, show the intermediate cathode sheets in position with the platens open (FIG. 9) and as pressed when the platens are closed (FIG. 10). Sufficient force is applied on the platens by the hydraulic ram to cause the face tooling on the platens to emboss and cold work each sheet in adjacent areas over the entire planar surface between the crimped edge portions of the sheet; and also cause the crimped edge portions to be upset and cold worked. The metal in the areas surrounding each of the points or loci where the spherical surfaces of the protruding balls engage the sheet is stressed to beyond its elastic limit with the result that the pressed intermediate cathode is given a permanent set. It is significant to note here also that the intermediate cathode sheet prior to pressing has been subjected to a certain amount of annealing. While the starting sheet is receiving electrolytically deposited copper in the commercial tank, the heat from the circulating electrolyte solution in the commercial tank causes a sufficient annealing of the metal in the cathode sheet to render the intermediate cathode amenable to the cold working mentioned above.

After the pressing operation, the press platens are moved to open position, the passed intermediate cathodes, now having a permanent set, are returned to the commercial electrolytic tank, positioned and centered between the anodes, and the electrolytic process is continued until sufficient copper is deposited on them from the anodes to produce the thickness desired for commercial copper cathodes of commerce.

Referring now to FIGS. 14, 15 and 16, there is illustrated the intermediate cathode 30x after it has been pressed in the platen press; this intermediate cathode sheet, for convenience of description, being herein called a "pressed intermediate cathode." The pressed sheet has a layer of deposited copper on both sides. The two deposited surface layers have substantially uniform characteristics, since they were deposited on both sides of the sheet under like conditions in the electrolytic tank. The loop 28 has been secured to the top edge portion when it was prepared as a starting sheet. The side edge portions of the pressed intermediate cathode sheet 30x comprise vertically disposed parallel rigidizing crimps 134, 134a, extending from bottom edge 138 to top edge 138a. These crimps correspond to the ridged edge portions 34, 34a of the initial starting sheet (compare FIGS. 2 and 14). Horizontal crimps 135a to 135h correspond to the embossed crimps 35a to 35h of the starting sheet. These vertical ridges and horizontal crimps are not so sharp and pronounced in the pressed intermediate cathode sheets 30x as in the starting sheet 30, because there has been copper deposited on the thin starting sheets, and they have been subjected to pressure in the press, thus making the crimps and ridges less pronounced. The planar area 133 (corresponding to planar area 33 of the starting sheet) between the vertically extending ridges 134 and 134a, is in what may be called a "wavy" condition, since it has been embossed as above described, and cold worked, and stressed in adjacent loci over the entire planar area to beyond the elastic limit of the metal and it has been given a permanent set. The surface or topography of the planar area (on the obverse side as viewed in FIG. 14) is in the form of horizontally spaced, slightly raised points or loci 110 in spaced, parallel, horizontal rows 111a to 111l and spaced, parallel, vertical rows 112a to 112g, where the balls 90a of main ball-retaining strips 85a to 85g have engaged and embossed the sheet and horizontally spaced, slightly depressed points or loci 113 in spaced, parallel, horizontal rows 114a to 114l, and spaced, parallel, vertical rows 115a to 115h, where the balls 90 of the main ball-retaining strips 95a to 95h have engaged and embossed the sheet. The lower end portion 116 of the planar area is likewise embossed where the balls 90, 90a of the minor ball-retaining strips 87a to 87p and 97a to 97p have engaged the sheet.

In the lower end portion 116, the balls have produced similar raised and depressed points as above described but closer to each other than the embossed points where only the balls of the main ball-retaining strips have engaged the sheet. The second or reverse side surface of the pressed intermediate cathode sheet is reversed in surface topography from the topography of the first or obverse side, in that the high points of the obverse side are the low points on the reverse side. For purposes of description, the obverse side is the side as viewed in FIG. 14. Thus, substantially the entire planar area is stressed simultaneously in small adjacent areas surrounding each high and low point or locus to beyond the elastic limit of the metal, so that the sum total result is that such strains as may still exist in the pressed cathode sheet are compensating and the pressed intermediate cathode sheet when replaced in the commercial tank will remain straight throughout the time the cathode sheet is left in the commercial tank; that is, up to the time it requires to produce the finished cathodes of commerce.

In the foregoing, the invention has been described, for illustrative purposes, in connection with its particular application to the electrolytic refining of copper. However, it is well known in the art that, besides copper, other metals, more particularly nickel and zinc, are also produced by electrolytic refining. Many problems and practices are common to the electrolytic refining of all of these metals. And it will be understood by those skilled in the art that many of the features disclosed herein, with particular reference to copper, may advantageously be employed in the electrolytic refining of nickel or zinc which may be considered to be equivalents in the present circumstances. In view of the fact that many of the problems encountered in respect to the electrolytic refining of these metals are common to all, it will be understood that in construing the claims in an equivalent sense, the claims are intended to be construed as applying not only to copper, but also to its known equivalents.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A multiple platen press adapted for pressing metal cathode sheets produced in electrolytic refining of the metal which comprises a frame, a vertically disposed stationary end platen secured to said frame, a reciprocatable movable end platen aligned with said stationary platen, power driven means to move said reciprocatable platen in a forward stroke toward said stationary platen to closed position and in a rearward stroke away from said stationary platen to open position, a plurality of vertically disposed movable platens mounted between and aligned with said end platens and reciprocatable on said frame to closed and to open position in response to movement of said movable end platen, means to limit the distance of reciprocal movement of said movable platens, each pair of opposed faces of said platens having face tooling, the face tooling of a given one of the faces of each pair of opposed faces having spaced embossing protuberances over a major portion of the area of its platen and protruding toward its opposite opposed face, the face tooling of the face opposed to said given face having spaced embossing protuberances and protruding toward said given face, the embossing protuberances in one face of each pair of opposed faces being offset from the embossing protuberances of its opposed face, said platens when in open position permitting the insertion of a cathode sheet to be pressed between each pair of opposed platen faces, thereby accommodating a plurality of sheets for pressing at one time by interposing a sheet between each pair of opposed faces when said platens are open, said platens when in closed position causing the embossing protuberances of said face plate toolings to engage and stress the metal of the interposed sheets to beyond its elastic limit in adjacent areas over substantially the entire planar area of each sheet.

2. A multiple platen press according to claim 1, in which the embossing protuberances are arranged in horizontal and vertical rows on each platen face.

3. A multiple platen press according to claim 1, in which the embossing protuberances are spheroidal in form.

4. A multiple platen press according to claim 2, in which the embossing protuberances are spheroidal in form.

5. A multiple platen press according to claim 1, in which the embossing protuberances are segments of hard metallic spherical balls staked into bores in ball-retaining strips secured to the platens so that a segment of each of said balls extends beyond the surface of the strip into which it is staked.

6. A multiple platen press according to claim 5, in which backing strips are secured on each face of each pair of opposed faces in alignment with the ball-retaining strips on the opposed face of that pair.

7. A multiple platen press according to claim 6, in which said backing strips are mounted in parallel spaced relation spaced approximately four inches apart and said ball-retaining strips are mounted in parallel spaced relation with said backing strips and spaced approximately four inches apart and said balls are spaced along said ball-retaining strips approximately two inches apart.

References Cited

UNITED STATES PATENTS 2,853,740   9/1958   Simpson _____ 72—399

RONALD D. GREFE, *Primary Examiner.*

U.S. Cl. X.R.

72—404, 419, 415